United States Patent [19]

Braun et al.

[11] Patent Number: 4,829,159
[45] Date of Patent: May 9, 1989

[54] METHOD OF OPTIMIZING CONTROL OF PLURAL SWITCHED ELECTRIC LOADS TO REDUCE SWITCHING TRANSIENTS

[75] Inventors: Walter Braun, Alsdorf; Reinhard Kersten; Egbert Kuhl, both of Aachen, all of Fed. Rep. of Germany

[73] Assignee: U.S. Philips Corp., New York, N.Y.

[21] Appl. No.: 927,788

[22] Filed: Nov. 5, 1986

[30] Foreign Application Priority Data

Nov. 8, 1985 [DE] Fed. Rep. of Germany ....... 3539581

[51] Int. Cl.⁴ .............................................. H05B 1/02
[52] U.S. Cl. ..................................... 219/486; 219/483; 219/492; 219/501; 219/509; 307/38; 307/41
[58] Field of Search ............................... 219/483–486, 219/497, 494, 490, 491, 501, 507, 508, 509; 307/38–41

[56] References Cited

U.S. PATENT DOCUMENTS

| | | | |
|---|---|---|---|
| 3,912,906 | 10/1975 | McIntosh et al. | 219/486 |
| 4,256,951 | 3/1981 | Payne et al. | 219/486 |
| 4,313,061 | 1/1982 | Thomas | 307/41 |
| 4,447,712 | 5/1984 | Couillion | 219/486 |
| 4,510,398 | 4/1985 | Culp et al. | 307/41 |

FOREIGN PATENT DOCUMENTS 0004299 3/1979 European Pat. Off. .

Primary Examiner—M. H. Paschall
Attorney, Agent, or Firm—Bernard Franzblau

[57] ABSTRACT

A method of controlling several clocked loads controllable individually and independently of each other, more particularly heating loads of an electric oven, for minimizing the demand on an alternating current mains due to switching transients. More particularly, the loads are energized in sequence to prevent flickering when the loads are coupled to a common phase of the alternating current mains are switched on each time at the beginning of their clock period. The clock periods of the various loads are of equal length. All loads neither switched off nor switched to full power in a switching cycle are connected to the mains so as to be interlinked in time in a manner such that, when the preceding load is switched off, the next load is switched on. Such a switching cycle is started again each time at the beginning of a common clock period independently of the length of the switching cycle.

16 Claims, 4 Drawing Sheets

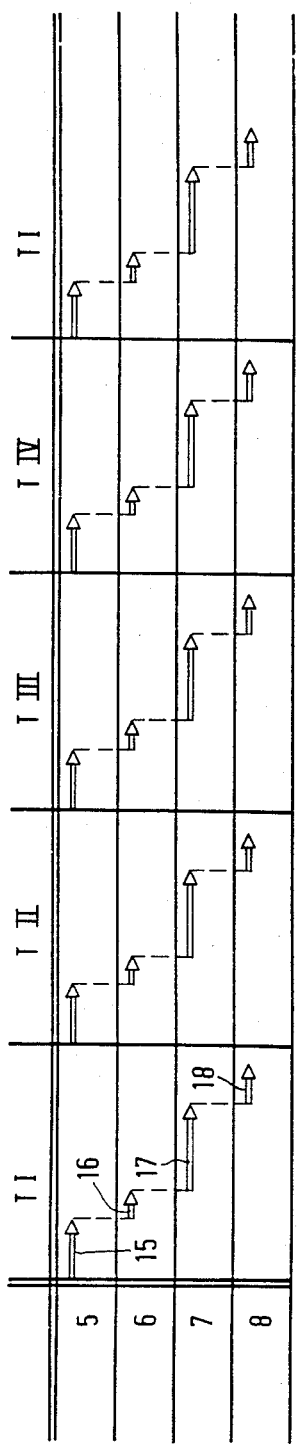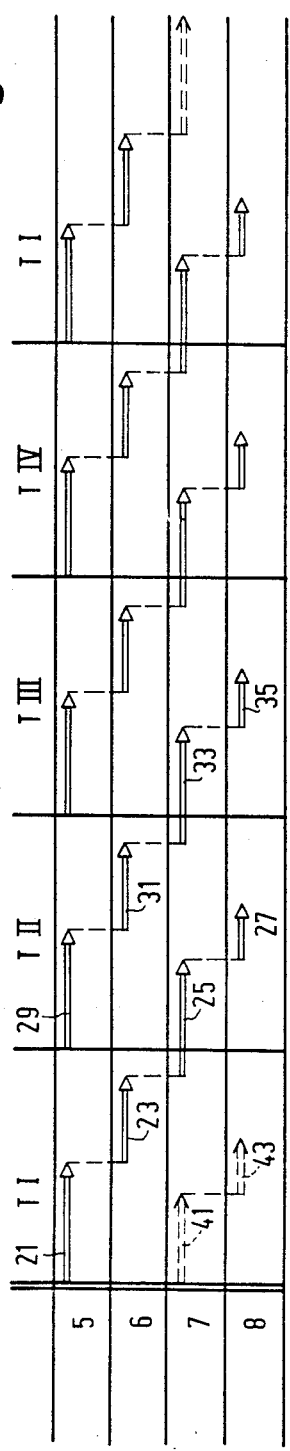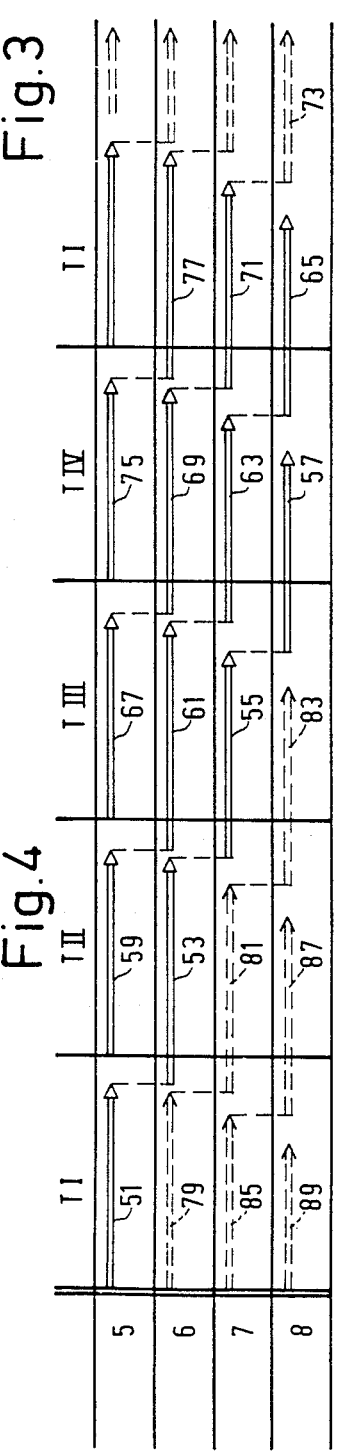

| | | $N_1$ | $N_2$ | $\Sigma \Delta t$ |
|---|---|---|---|---|
| a.) | 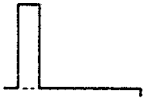 | 2 | 0 | 2,4 s |
| b.) | 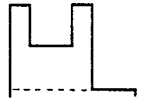 | 2 | 2 | 2,6 s |
| c.) |  | 1 | 4 | 1,6 s |
| d.) |  | 1 | 2 | 1,4 s |
| e.) | 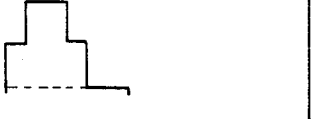 | 0 | 4 | 0,4 s |
Fig.6

METHOD OF OPTIMIZING CONTROL OF PLURAL SWITCHED ELECTRIC LOADS TO REDUCE SWITCHING TRANSIENTS

BACKGROUND OF THE INVENTION

This invention relates to a method of controlling several clocked loads that can be controlled individually and independently of each other, more particularly electrical heating loads of an electric oven, for minimizing the demand on an alternating current mains due to switching transients, more particularly due to flickering. The loads are fed from a common phase of the alternating current mains and are switched on each time at the beginning of their clock period. The clock periods of the various loads are of equal length.

When controlling the electrical loads of an electric oven, i.e. for example of the oven plates, it is generally deemed sufficient to switch the loads periodically on and off by means of a bi-metal relay. The clock periods are then generally long so that the power and temperature fluctuations resulting therefrom are not always compensated for satisfactorily by the thermal inertia of the system, more particularly of the oven plate itself. Due to the use of mechanical relays, the high-frequency interference caused by contact sparks and/or by switching outside the zero voltage passages increase with increasing frequency.

This problem is avoided by a known electronic circuit which switches the loads at the voltage or current zero passages by means of semiconductor elements and thus drastically reduces high-frequency interference. The loads are then switched on for whole multiples of the mains period, the transient time being typically several seconds. A substantial shortening of the clock periods is not possible in this circuit because an excessively high demand due to load variations and an excessively strong flicering then occur. The term "flickering" is to be understood to mean disturbing light fluctuations of lamps which are produced by the clocking of power loads at the same phase of the mains. Clock frequencies below 25 Hz are already cleared observed, but those in the range of about 10 Hz are found to be particularly disturbing. The international standard for the admissible flickering dose is defined in the IEC Publication 533 (Disturbances in supply systems caused by household appliances and similar electrical equipment). In this standard, each load variation is associated with a so-called recovery time whose duration depends upon the value of the load variation. The standard implies that during an observation time of from 5 to 15 minutes the sum of the recovery times (corresponding to the load variations occurring during the observation time) must not be larger than the observation time itself.

U.S. Pat. No. 4,256,951 discloses a power control circuit in which each load is switched on for a mains period. If, for example, four loads are switched by the control circuit, an individual heating load is switched on at full power during every forth mainx period, while it is switched on at half power during every eighth mains period, etc. In this switching mode of the loads, the flickering is not optimized. The flickering is further intensified in that the individual load should be designed for the multiple power with regard to its current consumption. This is obtained in that the load at full power is switched on only for a part of the time so that at a desired heating power of, for example, 2 kW and four loads to be switched the heater coil must have a current consumption corresponding to 8 kW. This 8 kW load is switched on at full power during every fourth mains period. This is very unfavourable with regard to the flickering. Furthermore, the heater coils must have unnecessarily large dimensions.

SUMMARY OF THE INVENTION

An object of the invention is to provide a method of controlling several clocked electrical loads fed from a common phase of an alternating current mains and controllable independently of each other with regard to their current consumption, in which the mains will be subjected to a minimum number of the smallest possible load variations and which therefore permits of obtaining short clock periods.

According to the invention, this object is achieved in that all loads neither switched off nor switched to full power are connected in a switching cycle to the mains so as to be interlinked in time in such a manner that when the preceding load is switched off, the next load is switched on, and such a switching cycle is started anew each time at the beginning of a common clock period independently of the length of the switching cycle.

In this method, the loads are consequently connected to the mains so as to be interlinked in time, that is to say that first the load 1 is switched on; after the latter has been switched off the load 2 is immediately switched on; after the latter has been switched off again the load 3 is immediately switched on, etc. Such a switching-on chain of the loads starts at the beginning of each new common clock period. This also means that if at the beginning of a new clock period the preceding switching cycle has not yet been terminated, nevertheless a new switching cycle begins. Thus, in the extreme case, a number of switching cycles equal to the number of loads to be switched can at least proceed in time simultaneously. The various switching cycles proceed, however, so as to be shifted in time by each time a common clock period with respect to each other.

The demand on the common phase of the alternating current mains with respect to the demand on the mains due to load variations is reduced on the one hand by this method of controlling the loads in that due to the interlinkage principle the number of load variations is reduced with respect to loads switched in an uncorrelated manner because the loads are connected to the mains in immediate succession of time. Moreover, due to the interlinkage principle of the method, with respect to the value of the load variation, only the amount of the difference of loads succeeding each other in time becomes effective and not, as in loads switched in an uncorrelated manner, the absolute amount of each load.

It is essential for the control of several loads that the loads can be controlled with respect to their power consumption independently of each other. The loads are connected in the manner described above in a switching cycle so as to be interlinked. This principle of interlinkage determines for a load arranged in the hindmost part of a switching cycle, i.e. switched in time after other loads, that its switching-on instant (and switching-off instant) depends upon the switching-on duration of the load switched on before it. Therefore, an always equal structure of the switching cycles or of the switching-on and switching-off instants of the loads is not obtained; the latter rather vary in dependence upon the adjusted powers. If a load is completely switched off or switched to full power (and hence permanently switched on), it does not find a place in the switching cycle and the following loads advance correspondingly.

According to a further embodiment of the invention, it is ensured that the switching-on and switching-off times of the loads in the various switching cycles may be varied so that the loads, averaged over several clock periods, consume the desired power. If the loads are solely switched during the zero voltage passages of the mains, the power consumption of the loads can be varied only in steps. If the desired power consumption of a load lies between two such steps, the switching times during several switching cycles are varied so that the loud is switched to and fro between the two possible switching steps whereby, on an average, the desired power consumption occurs.

According to a further embodiment of the invention, it is ensured that the order of succession of the loads interlinked in time in a switching cycle is chosen so that loads having a lower power consumption are arranged at the beginning and at the end of the switching cycle and loads having a higher power consumption are arranged in the middle of the switching cycle.

The demand on the mains due to load variations is particularly small if the loads are arranged within a switching cycle in such a manner that the smallest possible load variations occur. This is the case if the loads having a lower power consumption are arranged at the beginning and at the end of a switching cycle and the loads having a higher powe consumption are arranged in the middle of this switching cycle because in this case within a switching cycle the occurring load variations are of comparatively rate occurrence and/or are comparatively small.

According to further embodiments of the invention, it is ensured that the order of succession of the loads interlinked in time in a switching cycle is chosen so that the loads are arranged in accordance with their uniformly increasing or uniformly decreasing powers.

A further comparatively favourable arrangement of the loads in accordance with power in a switching cycle is the uniformly increasing or decreasing arrangement, in which each time at the beginning and at the end, respectively, a comparatively large switching edge occurs, but the other switching edges are very small.

According to a further embodiment of the invention, it is ensured that for the largest clocked individual load the maximum permissible demand on the mains due to load variations determines the smallest possible clock period and is used as a common clock period.

When the loads are interlinked in the manner described above, the demand on the mains due to load variations in a switching cycle is at most as large as should be the demand on the mains by the largest individual load because the sum of the load variations caused by the loads is at most as large as the load variations which would occur if only the largest individual load should be switched. Therefore, if, for example, the largest individual load is 2 kW and the other loads are 1 kW, the demand on the mains due to flickering is for all loads at most as large for this 2 kW individual load alone.

The common clock period can therefore be determined in a simple manner from the demand due to load variations permissible for the largest individual load. With the use of the method of interlinkage and load distribution in a suitable order of succession, with this clock period the permissible demand on the mains due to load variations is never exceeded, independently of which loads are switched on or to which poer these loads are switched.

According to a further embodiment of the invention, it is ensured that the common clock period is chosen as small as possible with respect to the maximum permissible demand due to load variations.

By particular constellations, i.e. by an order of succession in time of the loads within a switching-on chain, in which comparatively small load variations occur, a further reduction of the common clock period is possible. If, consequently, there is a desire to further optimize the clock period for a given constellation of the loads, i.e. to minimize the latter, the demand on the mains due to load variation can be calculated for this switching-on constellation of the loads just mentioned and, as the case may be, the clock period can be shortened.

According to a further embodiment of the invention, it is ensured that even at the beginning of the common first clock period the switching-on and switching-off instants of the electrical loads in all the switching cycles that may proceed simultaneously are calculated and the loads are switched correspondingly.

If, for example, all loads are switched to a comparatively high power, a single switching cycle of these loads proceeds for several clock periods. After the loads have been switched on, the stable switching conditions, i.e. the condition in which all switching cycles proceed parallel simultaneously, will be adjusted only after several clock periods. Therefore, for further optimization it is possible that already when the loads are switched on, i.e. at the beginning of the first clock period, this stationary switching condition normally attained only at a later instant is calculated and the loads are switched correspondingly immediately from the beginning of the first clock period.

According to a further embodiment of the invention, it is ensured that the loads have different priorities and, when a maximum permissible overall load is exceeded, the switching-on durations of loads of lower priority are shortened to such an extent that the permissible overall load is not passed.

The method of controlling several electrical loads controllable independently of each other moreover permits in a comparatively simple manner control of the overall load, which results from the loads just switched on and their switching-on duration. It is now possible to define a permissible overall load and to control the switching condition of the individual loads permanently as to whether this permissible defined overall load is exceeded. If this is the case, the switching-on times of loads of lower priority can be shortened to such an extent that the given overall load is not exceeded any longer. This permits, for example, of connecting an electric oven to a phase of an alternating current mains which, when all loads of the electric oven are switched, would be overloaded to full power. This will be interesting especially if new apparatus are connected to old existing electric equipments.

According to a further embodiment of the invention, it is ensured that the loads having a switching-on duration fluctuating only comparatively slightly are arranged in the forepart of the switching cycle.

If it is known beforehand that individual loads remain switched to a comparatively constant power value, but that other loads are varied comparatively strongly with respect to the switched-on power, it is favourable to arrange the loads having a switching-on duration fluctuating comparatively slightly in the forepart of the switching-on cycles because then the switching-on and switching-off cycles of the loads succeeding this load in a switching cycle vary comparatively slightly and the calculation operations for the control are thus reduced.

BRIEF DESCRIPTION OF THE DRAWING

In order that the invention may be readily carried out, it will now be described more fully with reference to the accompanying drawings, in which:

FIG. 2 shows the switching cycles for several clock periods of four loads switched on for a comparatively short time.

FIG. 3 shows the switching cycles for several clock periods of four loads switched on for a medium time, FIG. 4 shows the switching cycles for several clock periods of four loads switched nearly to full power, FIG. 6 shows a few switching examples for loads and the recovery time obtained each time according to the existing now standard.

DESCRIPTION OF THE PREFERRED EMBODIMENTS

Figure 1:
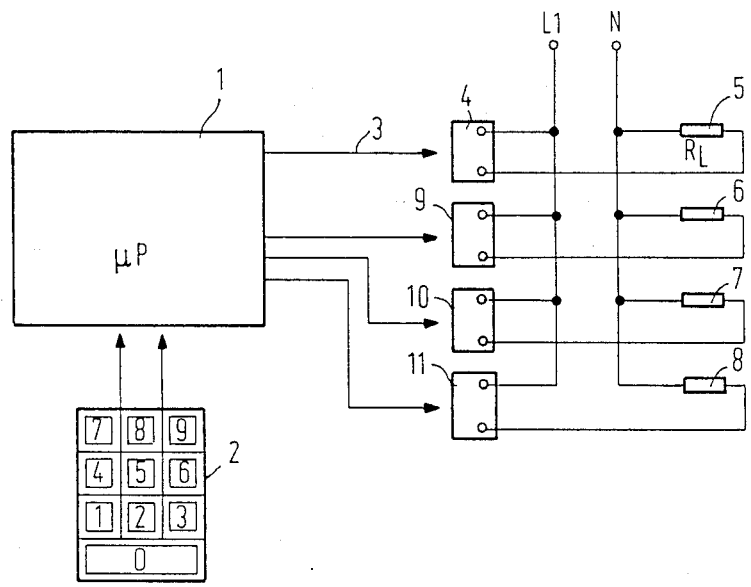
FIG. 1 shows a block circuit diagram of a circuit arrangement for the method.

FIG. 1 shows a block circuit diagram of a circuit arrangement designed for the method of controlling several electrical loads controllable independently of each other with respect to their power consumption. The microprocessor 1 fulfils central control functions.

It is connected on the one hand to a key-board 2, which serves to record data and thus has the function of a control panel. Through this key-board 2, the required data, such as, for example, the desired powers of the individual loads, are supplied to the microprocessor 1. Moreover, the microprocessor is connected through a connection 3 to an electrical load relay 4. This load relay 4 is switched by TTL signals on the lead 3. The load relay 4 is moreover connected on the one hand to a mains phase $L_1$ and on the other hand to a load 5. The load relay changes over, when a corresponding TTL signal is applied to the lead 3, in the next voltage passage of the mains phase $L_1$. This load 5, which represents, for example, an oven plate, is moreover connected to the zero conductor N of the alternating current mains. In the same manner, further loads 6, 7 and 8 can be connected by means of electrical load relays 9, 10 and 11 to the same phase of the alternating current mains. The loads 5, 6, 7 and 8 are therefore not connected directly through the key-board 2 to the alternating current mains $L_1$, N. It supplies only the desired data to the microprocessor 1, which then switches the loads 5, 6, 7 and 8 in accordance with the method. The number of loads is then determined by the kind of application.

FIG. 2 shows symbolically the variation in time of several clock periods and of the switching cycles proceeding therein. At the beginning of the clock period I (TI), the load 5 is switched on for a time determined by the desired power, which is indicated symbolically in FIG. 2 by the arrow 15. Immediately after the load 5 has been switched off, the load 6 is switched on, which is indicated by the arrow 16. The load 6 remains switched on for a shorter time than the load 5. After it has been switched off, the load 7 is switched on (indicated symbolically by the arrow 17) and, after the latter has been switched off, the load 8 is switched on (indicated symbolically by the arrow 18). In this example, the sum of the switching-on times of the four loads, i.e. of a switching cycle, is smaller than a clock period.

At the beginning of the clock period II (TII), the four loads are again connected in the same manner in a switching cycle to the mains, it being assumed in this example and in the following examples that the adjusted powers of the individual loads are not varied.

The time diagram in FIG. 3 shows symbolically the switching-on times of the same four loads, but in this example they are switched to higher powers. At the beginning of the clock period I, again the load 5 is switched on (arrow 21), after which the load 6 is switched on (arrow 23), then the load 7 is switched on (arrow 25) and subsequently the load 8 is switched on (arrow 27). During the switching-on period of the load 7, a new clock period II begins At this instant, a new switching-on cycle is started in that first the load 5 is switched on, indicated by the arrow 29. At the same time, however, the first switching-on chain proceeds, which in this example means that the load 7 also remains switched on, which is indicated by the arrow 25. In the second switching cycle, after the load 5 has been switched off, the load 6 is switched on (arrow 31). During the switching-on period of this load in the switching cycle II, the switching cycle I is terminated in that the load 8 is switched off. Meanwhile the second switching cycle proceeds: after the load 6 has been switched off, the load 7 is switched on (arrow 33), after which the load 8 is switched on (arrow 35).

In this example, a switching cycle therefore each time has a length of about 1½ clock periods. At the beginning of each new clock period, a new switching cycle is started without the already proceeding switching cycle being interrupted. Thus, in this example, during approximately the first half of each clock period two switching cycles proceed parallel to eachother.

If, at the beginning of the clock period I, the switching-on and switching-off instants of the electrical loads in the following switching cycles are already calculated, the loads may be switched according to this "stationary" condition so that the case marked by the arrows 41 and 43 in the form of broken lines arises. Already at the beginning of the clock period I, the stable switching condition is calculated by the microprocessor 1, as it is adjusted in this example normally only at the beginning of the clock period II. This means that already at the beginning of the clock period I the load 7 is switched on for a residual time, which is indicated in the Figure by the arrow 41. This switching cycle is started effectively in the middle and is then normally brought to an end, which means that, after the load 7 has been switched off, the load 8 is switched on (arrow 43).

FIG. 4 shows symbolically the switching-on cycles in the case of four equal loads, in this example the individual loads 5 to 8 being switched to substantially full power. Correspondingly, the switching-on duration of the load 5 during the clock period I (arrow 51) is substantially equal to the length of the first clock period. As in the example shown in FIGS. 2 and 3, the loads 6, 7 and 8 ae then interlinked in a time sequence which is indicated in the Figure by the arrows 53, 55 and 57. Due to the long switching-on periods, the first switching-on cycle terminates in this example only approximately in the middle of the clock period IV (TIV). At the beginning of the clock period II, a further switching cycle is started, which is indicated by the arrows 59, 61, 63 and 65. During the procedure of the first switching cycle, at the beginning of the clock period III (TIII) the third switching cycle is started, which is indicated by the arrows 67, 69, 71 etc. Although the load 8 within the first switching cycle is still switched on (arrow 57) at the beginning of the clock period IV, the load 5 is switched on already for the fourth time, which is indicated by the arrow 75.

Due to the comparatively long switching-on times of the loads in this example and since at the beginning of each clock period a new switching cycle is started, three or four loads are always switched on simultaneously from the beginning of the clock period IV.

Also in this example, again the case is represented in which already at the beginning of the first clock period the switching-on and switching-off times of all loads, which are adjusted in the stationary condition, are calculated and the loads are switched correspondingly. This means that the stationary condition, as adjusted in this example only with the clock period IV, is determined already at the beginning of the clock period I and the loads are switched correspondingly. Thus, at this instant a switching cycle indicated by the arrows 79, 81 and 83 begins already with the load 6, while a further switching cycle indicated by the arrows 85 and 87 begins with the load 7 and a further switching cycle indicated by the arrow 89 begins with the load 8.

In FIGS. 2, 3 and 4, three examples for the same four loads are shown in which the loads are switched to powers of different height. If in the present examples it is assumed that all four loads have the same current consumption, it holds, for example, for the example shown in FIG. 2 that at the beginning of the clock period I a switching-on edge occurs and a short time before the end of the first clock period a switching-off edge occurs. The same holds for each further clock period. This means a very favourable load variation behaviour because in each clock period a variation of the current consumption occurs only two times. The same holds for the examples shown in FIGS. 3 and 4. For example, in the stationary condition during the clock period III in FIG. 3, a switching-on edge occurs at the beginning of the clock period and a switching-off edge occurs approximately in the middle of the clock period. Also in this example, the same holds for the further following clock periods. The same holds for the example shown in FIG. 4.

The demand on the alternating current mains due to the load variations obtained by the switching-on and switching-off edges consequently remains constant, that is to say that it is independent of the power adjustment chosen for the various loads.

If the four loads have different power consumptions, it is favourable to arrange these loads within a switching cycle in such a manner that the small loads are switched on at the beginning and at the end and the larger loads are switched on in the middle of the switching cycle. This means in the present examples that the loads 5 and 8 are smaller loads and the loads 6 and 7 are larger loads. Since this current consumption is determined by the physical properties, for example of the heater coils, the most favourable order of succession is consequently fixedly defined and must not be calculated again in accordance with the switching conditions of the loads.

Figure 5:
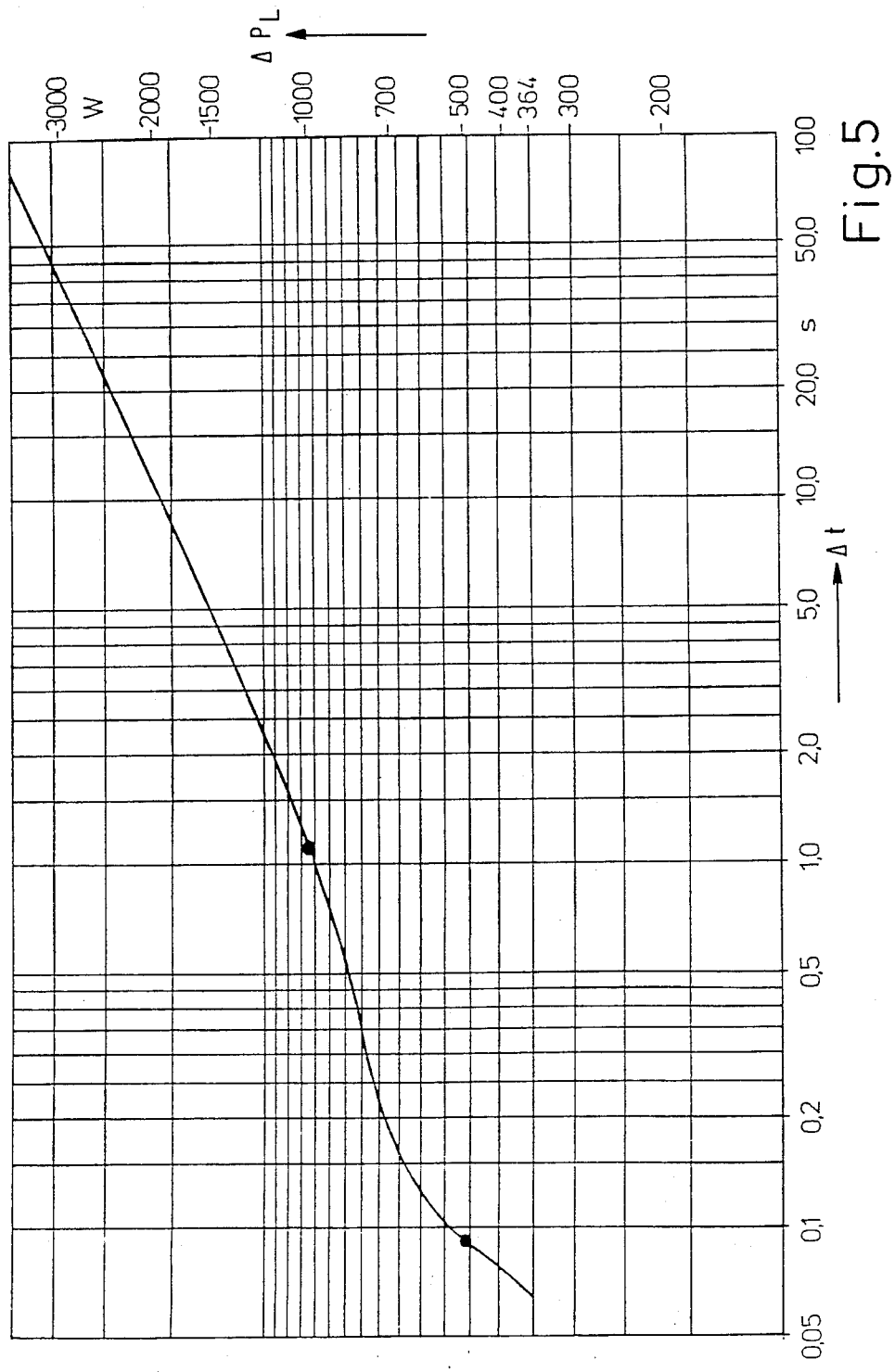
FIG. 5 shows a diagram from the existing flickering standard for determining the recovery time in dependence upon the load variation.

FIG. 5 shows a diagram from the existing flickering standard (IEC Publication 533), in which it is defined how large the demand on the mains is allowed to be due to load variations by a user. By means of the diagram in FIG. 5, in dependence upon the occurring ohmic load variation $\Delta P_L$ at a phase (220 V) the associated recovery time $\Delta t$ can be determined. For example, for a load variation of 500 W the recovery time is about 0.1 sec and for a load variation of 1000 W this time is about 1.2 sec. If therefore, for example, loads of 1000 W have to be switched, during a time interval of 5 to 15 minutes a switching-on or switching-off edge is allowed to occur only every 1.2 sec. If in a given time interval different loads having different powers are switched, for each individual load edge the recovery time is to be determined. The sum of the recovery times of all the load variations occurring in this time interval must not be larger than the time interval itself.

FIG. 6 shows a few switching constellations of loads and the sum of the recovery times each time obtained, $N_1$ being the number of the large load jumps (1000 W) and $N_2$ being the number of the small load jumps (500 W). In the first example, only one load having a power consumption of 1000 W is switched. Consequently, two load jumps each of 1000 W occur so that the sum of the recovery times ($\Sigma \Delta t$) is 2.4 sec., which means that the switching cycle shown for this load is allowed to be repeated only every 2.4 sec.

In the switching example B further shown in FIG. 6, two loads each having a power consumption of 1000 W and two loads each having a power consumption of 500 W are switched in such a manner that each time the 1000 W loads are arranged at the beginning and at the end of the switching cycle and the two loads of 500 W are arranged in the middle. Within such a switching cycle, two load jumps 1000 W and two load jumps 500 W occur. According to the diagram shown in FIG. 5, a sum of the recovery times of 2.6 sec. is obtained. In the example C also shown in FIG. 6, the same loads as in example B are switched, but they are now arranged so that alternately a load having a higher power and a load having a lower power are switched. Per switching cycle, a large load jump and four small load jumps ae then obtained. This results in a sum of the recovery times of 1.6 sec. In the examples D and E, again the same four loads are arranged in a more favourable manner, that is to say that in the example D the loads are arranged in accordance with decreasing and increasing powers, respectively, which leads to a sum of the recovery times of 1.4 sec. In the example E, the loads having a higher power are arranged in the middle and the loads having a smaller power are arranged at the beginning and at the end. This leads not to a large variation jump, but only to four small load jumps. According to the flickering standard, this results in a sum of the recovery times of only 0.4 sec.

It appears from the examples B to E, in which each time the same four loads are switched, that an arrangement of the loads within a switching cycle in accordance with example E distinctly yields the miost favourable result. This means that in this example the shortest possible clock period is only 0.4 sec. Also, the arrangement of the loads within a switching cycle shown in the example D is still comparatively favourable. In this case, a possible clock period of 1.4 sec. is obtained.

In the method of controlling several electrical loads according to the invention, in the simplest case there can consequently be started from the largest individual load. In the examples B to E shown in FIG. 6, this would mean that only the largest individual load (1000 W) is taken into account and a clock period of 2.4 sec. is chosen. If the clock period should become as short as possible, for example in order to obtain a more favourable control behaviour, with, for example, two loads of each 1000 W and two loads of each 500 W the loads are switched in accordance with the example E shown in FIG. 6, in which the sum of the recovery toimes is smallest. In this example, the clock period can then be shortened to only 0.4 sec.

The circuit arrangement shown in FIG. 1, which operates according to the method of controlling several electrical loads, can be used in a simple manner in an electrical heating apparatus, for example, an electric oven. In an electric oven, the loads 5, 6, 7 and 8 represent the heater windings of the hot plates of the oven etc. The key-board 2 in this case corresponds to the operating panel of the electric oven, by means of which the desired heating powers or temperature values of the hot plates of the oven etc. are supplied to the microprocessor 1 incorporated in the apparatus.

What is claimed is:

1. A method of controlling a plurality of clocked loads controllable individually and independently of each other, more particularly electrical heating loads of an electric oven, for minimizing the demand on an alternating current mains due to switching transients, the loads being fed from a common phase of the alternating current mains and being switched on each time at the beginning of a clock period, the clock periods of the various loads being of the same length, the improvement comprising:

sequentially connecting to the mains all loads neither switched off nor switched to full power in a switching cycle so as to be interlinked in time in such a manner that, when a preceding load is switched off, a next load is switched on, and starting again such as a switching cycle each time at the beginning of a common clock period independently of the length of the switching cycle.

2. A method as claimed in claim 1, further comprising, varying the switching-on and switching-off times of the loads in the various switching cycles so that the loads, averaged over several clock periods, consume the desired power.

3. A method as claimed in claim 1 or 2, characterized in that sequence in which the loads are switched on in a switching cycle so as to be interlinked in time is chosen so that loads having a lower power consumption are switched at the beginning and at the end of the switching cycle and loads having a larger power consumption are switched in the middle of the switching cycle.

4. A method as claimed in claim 1 or 2, characterized in that the sequence in which the loads are switched on in a switching cycle so as to be interlinked in time is chosen so that the loads are switched in accordance with their uniformly increasing powers.

5. A method as claimed in claim 1 or 2, characterized in that the sequence in which the loads are switched on in a switching cycle so as to be interlinked in time is chosen so that the loads are switched in accordance with their uniformly decreasing powers.

6. A method as claimed in claim 1 or 2 further comprising, determining for the largest clocked individual load and the maximum permissible demand on the mains due to load variations, the smallest possible clock period to be used as a common clock period.

7. A method as claimed in claim 6, characterized in that the common clock period is chosen as small as possible with respect to the maximum permissible demand on the mains due to load variations.

8. A method as claimed in claims 1 or 2 further comprising, calculating at the beginning of a first common clock period the switching-on and switching-off instants of the electrical loads in all switching cycles that may proceed simultaneously and switching the loads correspondingly.

9. A method as claimed in claims 1 or 2, characterized in that the loads have different priorities and, when a maximum permissible overall load is exceeded, shortening the switching-on times of loads of lower priority such that the permissible overall load is not exceeded.

10. A method as claimed in claims 1 or 2 further comprising, arranging in the forepart of the switching cycle the loads having a switching-on duration fluctuating only slightly.

11. A method as claimed in claim 3 further comprising: determining the shortest possible common clock period to be used in the case of the largest individual clocked load and the maximum permissible demand on the mains due to the load variations.

12. A method as claimed in claims 1 or 2 wherein the common clock period is chosen as small as possible with respect to the maximum permissible demand on the mains due to load variations.

13. An electric heating apparatus for a plurality of clocked electric heating loads controllable individually and independently of each other, said apparatus comprising:

relay means for selectively coupling said loads to a common phase of a source of AC supply voltage, a microprocessor for controlling the operation of said relay means so as to sequentially connect the loads to the AC supply voltage in a switching cycle in which the loads are interlinked in time so that when one load is switched off a next load is switched on, a switching cycle being started again each time at the beginning of a common clock period independently of the length of the switching cycle whereby the clock periods of the loads are all equal, and a keyboard connected to the microprocessor to supply thereto under user operation data related to the desired power levels of individual ones of the electric heating loads such that the time period a load is connected to the AC supply voltage varies with the power level of the load whereby the length of a switching cycle is variable.

14. Apparatus for supplying power to a plurality of loads in sequence from a common source of AC supply voltage where the power to each load is selectable individually and independently of the other loads comprising: a plurality of controlled switching devices for coupling respective ones of said loads to said common source of AC supply voltage, means for operating said switching devices in sequence such that when a first load in the sequence is switched off a second load in the sequence is switched on and so on through a complete switching cycle, means for adjusting the length of time each switching device is switched on so that the on time of its respective load is determined by the desired power level individually set for such load and independent of the power level set for other loads in the sequence whereby a switching cycle is variable and is determined by the sum of the individual power levels set for the individual loads, and means for clocking said operating means to periodically start a new switching cycle independent of whether or not a preceding switching cycle has been completed.

15. Apparatus as claimed in claim 14 wherein said operating means operates the switching devices so that only one switching device is switched on at any instant of time thereby to minimize transient loading on the common source of AC supply voltage due to switching of the loads.

16. A method of sequentially applying power from a common source of AC supply voltage to a plurality of loads having power levels settable individually and independently of each other and in a manner so as to minimize transient loading on said common source of AC supply voltage, the method comprising: connecting the loads to the common source of AC supply voltage in sequence in a repetitive switching cycle such that when a first load in the sequence is switched off a second load is switched on and so on through each switching cycle, where each load is connected to the common source of AC supply voltage for a period of time determined by the desired power level set for such load and independent of power levels set for other ones of the loads whereby the length of the switching cycle is variable as a function of the individual power settings of the plurality of loads, and periodically starting a new switching cycle at regular time intervals independently of the length of the switching cycle.

* * * * *